US008732222B2

(12) United States Patent
Horvitz et al.

(10) Patent No.: US 8,732,222 B2
(45) Date of Patent: *May 20, 2014

(54) INTEGRATING SPECIALIZED KNOWLEDGE SOURCES INTO A GENERAL SEARCH SERVICE

(75) Inventors: Eric Horvitz, Kirkland, WA (US); Johnson Apacible, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 39 days.

This patent is subject to a terminal disclaimer.

(21) Appl. No.: 12/827,370

(22) Filed: Jun. 30, 2010

(65) Prior Publication Data

US 2012/0005148 A1    Jan. 5, 2012

(51) Int. Cl.
*G06F 7/00*        (2006.01)
*G06F 17/00*       (2006.01)
*G06F 17/30*       (2006.01)

(52) U.S. Cl.
CPC ............................... *G06F 17/30702* (2013.01)
USPC ........................... 707/899; 707/708; 707/723

(58) Field of Classification Search
CPC ................. G06F 17/30684; G06F 17/30687; G06F 17/30867; G06F 17/30864; G06F 17/30675; G06F 17/30876; G06F 17/30893; G06F 11/3447; G06F 11/3495; G06F 17/30696
USPC .................... 707/759; 703/2; 704/8; 709/202
See application file for complete search history.

(56) References Cited

U.S. PATENT DOCUMENTS

| 5,987,457 | A  | * | 11/1999 | Ballard ................................. 1/1 |
| 6,647,383 | B1 | * | 11/2003 | August et al. ........................ 1/1 |
| 6,757,646 | B2 | * | 6/2004 | Marchisio ........................ 704/8 |
| 7,389,208 | B1 | * | 6/2008 | Solinsky ............................ 703/2 |
| 7,516,113 | B2 | * | 4/2009 | Horvitz et al. .................. 706/46 |
| 7,676,539 | B2 | * | 3/2010 | Jhoney et al. ................. 709/202 |

(Continued)

OTHER PUBLICATIONS

David Azari, et al., "Actions, Answers, and Uncertainty: A Decision-Making Perspective on Web-Based Question Answering", This paper is an extended version of the conference article, D. Azari, E. Horvitz, S. Dumais, E. Brill. Web-based question answering: A decision making perspective. Proceedings of the Conference on Uncertainty and Artificial Intelligence, 2003, pp. 11-19.

(Continued)

*Primary Examiner* — Susan Chen
(74) *Attorney, Agent, or Firm* — Dan Choi; Carole Boelitz; Micky Minhas (57) ABSTRACT

Embodiments are described for a system for integrating expert sources of knowledge into a general search service. The method can include a general search engine interface to receive a search query with at least one search term from a user. An expert knowledge engine can enable retrieval of expert information and analyzes. A predictive model module can be used to determine a probability that an expert knowledge engine may provide a valuable response to the query. The search query can be routed to the expert knowledge engine based on a cost-benefit analysis. A query reformulation module can reformulate a query for use by the expert knowledge engine. A display module can be employed to combine the expert search results with other search results.

20 Claims, 5 Drawing Sheets

(56) References Cited

U.S. PATENT DOCUMENTS

| | | | |
|---|---|---|---|
| 2008/0215564 A1* | 9/2008 | Bratseth | 707/5 |
| 2009/0006324 A1 | 1/2009 | Morris et al. | |
| 2009/0089296 A1 | 4/2009 | Stemeseder et al. | |
| 2009/0192966 A1 | 7/2009 | Horvitz et al. | |
| 2009/0234813 A1 | 9/2009 | Gutlapalli et al. | |
| 2009/0281966 A1 | 11/2009 | Biggs et al. | |
| 2010/0036830 A1 | 2/2010 | Lee | |
| 2010/0306213 A1* | 12/2010 | Taylor et al. | 707/759 |
| 2011/0161129 A1* | 6/2011 | Barsoba et al. | 705/7.14 |
| 2011/0289063 A1* | 11/2011 | Radlinski et al. | 707/706 |

OTHER PUBLICATIONS

Rinat Khoussainov, "Economics of Distributed Web Search: A Machine Learning Approach", A thesis submitted to the National University of Ireland, Dublin for the degree of Doctor of Philosophy in the Faculty of Science, Aug. 2004, pp. 1-224.

Ingo Glockner, "Filtering and Fusion of Question-Answering Streams by Robust Textual Inference", FernUniversitat in Hagen, 58084 Hagen, Germany, iglockner@web.de.

Jiang Bian, et al., "Finding the Right Facts in the Crowd: Factoid Question Answering over Social Media", WWW 2008, Apr. 21-25, 2008, Beijing, China, ACM 978-1-60558-085-2/08/04, pp. 467-476.

* cited by examiner

INTEGRATING SPECIALIZED KNOWLEDGE SOURCES INTO A GENERAL SEARCH SERVICE

BACKGROUND

The goal of developing computational machinery with the ability to generate answers to freely-posed questions or to provide relevant information in response to free-text queries has long been sought. General search services and question-answering systems depend on techniques for analyzing free-text queries or questions and depend on techniques for composing or identifying relevant information or explicit answers from a data set or database of information. Providing relevant information or explicit answers to freely worded queries or questions can be a challenging problem because a structured or unstructured dataset being searched may not contain explicit matching information or answers. In addition a data set may contain multiple variants of relevant answers or answer components.

Approaches to information retrieval and question answering have relied on the application of several key concepts from information retrieval, information extraction, machine learning, and natural language processing (NLP). Automatic question answering from a single, constrained information source is extremely challenging. Consider the difficulty of gleaning an answer to the question "Who killed Abraham Lincoln?" from a source which contains only the text "John Wilkes Booth altered history with a bullet. He will forever be known as the man who ended Abraham Lincoln's life." However, answering a question is easier when the vast resources of the internet are used, since hundreds of web pages contain the literal string "killed Abraham Lincoln," providing multiple opportunities for matching and composition.

Many efforts in question answering have focused on fact-based, short-answer questions such as "Who killed Abraham Lincoln?", "What was the length of the Wright brothers first flight?", "When did CNN begin broadcasting" or "What two US biochemists won the Nobel Prize in medicine in 1992?" Some question-answering systems have used NLP analyses to augment standard information retrieval techniques. These systems may identify candidate passages using information retrieval (IR) techniques, and then perform more detailed linguistic analyses of both the question and matching passages to find specific answers. A variety of linguistic resources (part-of-speech tagging, parsing, named entity extraction, semantic relations, dictionaries, etc.) may be used to support question answering. Other approaches may use general information retrieval methods that employ methods for rewriting questions or reformulating queries to match the format of answers and then combine multiple results to generate answers.

Most information retrieval systems used in searching operate at the level of entire documents. For example, in searching the web, pointers to complete web pages or documents are returned in response to a search query. However, there has been an interest in finer-grained analyses focused on methods for obtaining answers to questions rather than just retrieving potentially relevant documents or the best matching passages for search queries.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. While certain disadvantages of prior technologies are noted above, the claimed subject matter is not to be limited to implementations that solve any or all of the noted disadvantages of the prior technologies.

Embodiments are described for a technology and methodology for integrating specialized sources of knowledge, such as focused, deep expertise about one or more topics into a general search service. The knowledge source may be available or provided to the general search service as a specialized stand-alone search service with a separate specialized database, indices, computational methods, and/or distinct retrieval methods. A general service for information data retrieval or question asking can include a search engine interface to receive a search query with at least one search term from a user. An expert knowledge engine employed within the expert knowledge source can enable retrieval of expert data. An interpretive or predictive model module can be used to determine a probability that the information retrieval goals of the user who generated the query search terms and submitted the query search terms to the general search service can be addressed by the expert search service. Predictive models can be constructed from a large library of cases, where each case contains one or more features of queries, as well as a notation about whether or not an information goal can be addressed by the expert knowledge source. In one embodiment, the types of knowledge provided by an expert knowledge source are decomposed into a set of expertises by topic, and predictive models can consider the likelihood that an informational goal that led to a search query may be appropriately addressed by expertise represented by each topic. If there is a bandwidth cost or a fee for using the expert knowledge source, a search query made to the general engine can be routed to the expert knowledge engine when the probability the search query is related to or may be best handled with the expertise of an expert knowledge source exceeds a threshold.

Given the relevance of an expert source to a topic, the initial form of the query may be converted or translated into a form that the expert service can use. A query reformulation module can reformulate a query for use by the expert knowledge engine such that an initial general query is structured in a useful way for the expert knowledge source.

A display module can be configured to display the expert search results to the user, and the expert search results may be integrated with general search results, or highlighted or structured in a special manner. Another embodiment is a method for integrating multiple expert knowledge sources into general search services. The method may include receiving a search query having search terms from a user.

DETAILED DESCRIPTION

Reference will now be made to the exemplary embodiments illustrated in the drawings, and specific language will be used herein to describe the same. It will nevertheless be understood that no limitation of the scope of the technology is thereby intended. Alterations and further modifications of the features illustrated herein, and additional applications of the embodiments as illustrated herein, which would occur to one skilled in the relevant art and having possession of this disclosure, are to be considered within the scope of the description.

Answers to freely posed questions submitted through web search engines may be generated based upon information drawn from the web (i.e., the Internet). Sometimes the redundancy of information on the web can be exploited by making multiple queries to search engines and then combining the search results into an answer. However, expert knowledge sources are being developed that can provide search results or computed answers for specific areas of knowledge. For example, expert knowledge sources may be a specialized expert knowledge engine with search information about mechanical engineering, statistics, chemistry, fashion, demographics, geography, physics, information technology, or other detailed expert subject matter areas.

Figure 1:
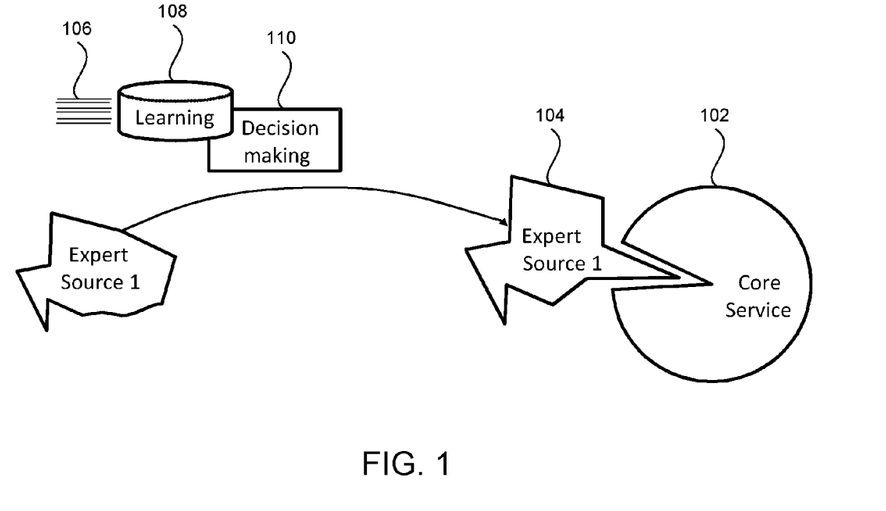
FIG. 1 is a block diagram illustrating an embodiment of a system for integrating an expert knowledge engine into a search service.

FIG. 1 illustrates that a core search service 102 or general search service may be provided to a user and an expert knowledge source 104 with an expert knowledge engine can be integrated into the core or general search service. The present technology can also use techniques for guiding expert information gathering in support of answering search queries or search questions via the learning 108 of probabilistic models that predict relevance of an expert knowledge engine to a search query 106 from a user.

Such probabilistic models can be constructed from databases of queries sent to the general service and/or features associated with the general service that may be extracted from the search queries by a feature extractor. Then associated tags that describe each search query as being relevant or not relevant can be handled by the expert source. Beyond the use of expert tags to indicate the relevance or irrelevance of an expert knowledge source or expert service for handling queries and associated search features, indications about relevance can be automatically learned by processing queries routed to the expert service, and analyzing signals from the handling of the search query by the system or the reaction of users to the output of the search query. For example, queries can be implicitly analyzed via automated analysis of signals that can provide information about success (or failure) as a user may: click through, dwell on results, over-look results, and/or dismiss results as signals of failure.

A pre-search decision 110 can be made about the relevance of an expert search service or expert search engine (e.g., corpora/expertise provider) to a search query for a user. When an expert knowledge engine is related to a search query then the search query can be sent to the expert knowledge engine.

Figure 2:
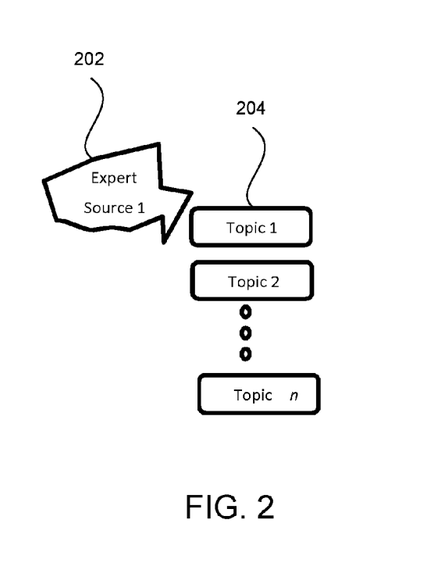
FIG. 2 is a diagram illustrating an expert search service having topics contained in the expert search service.

The expert knowledge engine can have expert information about just one subject or a plurality of topics contained within a subject. FIG. 2 illustrates that an expert knowledge engine or expert source 202 may have several topics 204 contained within the expert knowledge engine. The term expert knowledge engine can also include computational engines that may perform computations on data in a search query to provide synthesized results and/or computed results in addition to existing documents, facts, and/or images.

Query reformulation may be used to adapt a raw query from a search user to a reformulated query that can be more effectively used by an expert knowledge engine and/or service sub-topic. In addition, predictive models that are trained from data about the successes and failures of queries sent to the expert information service and outputs from the expert information service can also predict the likelihood that answers received from the expert knowledge engine are correct based on multiple observation criteria, including signals about reliability of the answers provided by the expert system itself. Post-hoc classification with predictive models can provide ratings about the answer's relevance and whether the answer may or may not be displayed to the end user, as a final step of quality assurance that can interpret the end-to-end performance of the analysis for the information goal and query at hand. The system can use this last stage of analysis to determine a likelihood that the answer obtained from the expert knowledge engine is believed to be relevant or correct. In one embodiment, depending on the inferred likelihood that the analysis has been successful, the resulting answer(s) may be displayed to users in a format that combines the expert search results with the general search results from the general search services.

The technology can provide a system for integrating expert knowledge sources into a search service. A higher level overview of a system for using expert knowledge sources in combination with more general search services will first be described followed by a more detailed description of an example system.

Figure 3:
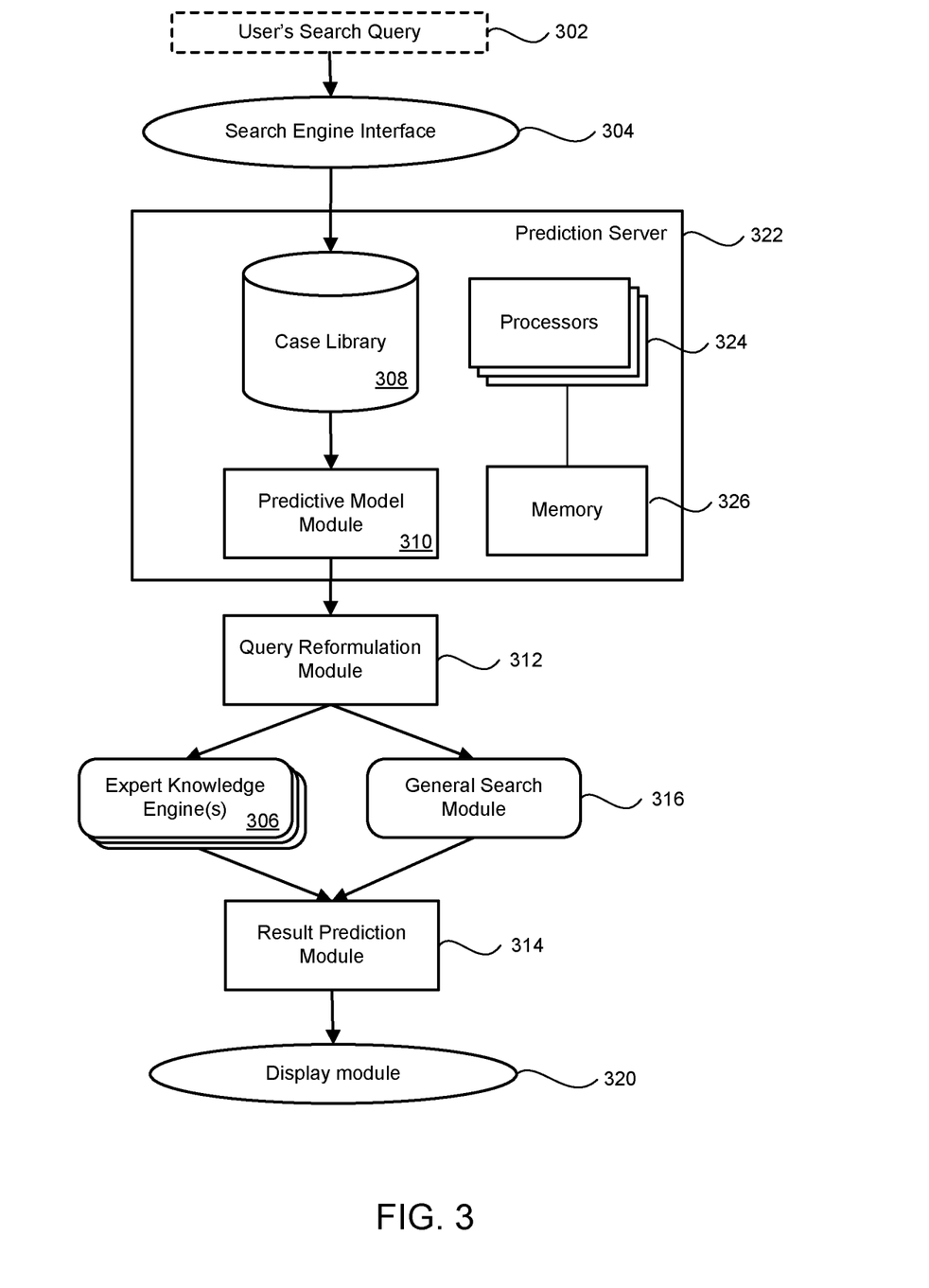
FIG. 3 is a block diagram illustrating an embodiment of integrating an expert knowledge engine into a search service.

FIG. 3 illustrates that a search engine interface 304 can receive a search query 302 having search terms from a user. The system can include at least one expert knowledge engine 306 or expert knowledge source to enable retrieval of expert data.

A case library 308 of data can be collected and tagged to link features or evidence about queries to situations where the informational goal and associated query were "relevant" versus "irrelevant" to the expert knowledge source. A predictive model module 310 can be used in decisions about routing the query to further phases of analysis in relation to the expert source based on the inferred likelihood that the query will be handled successfully. More specifically, the predictive model module can generate a predictive model using the case library that provides a measure of the likelihood (e.g., probability) that the expert knowledge engine can provide valuable information for the informational goals represented by the search query. In another embodiment, the inferred probability can be used in a quantitative decision analysis using an expected value and an expected cost for sending a search query to the expert knowledge engine to form a net expected value. Accordingly, the net expected value can be used to determine when to send the search query the expert knowledge engine.

The predictive module 310 may be located in a prediction server 322. The prediction server can include a plurality of hardware processors or processing cores 324 and hardware memory 326 that can be used for processing the case library database and/or for generating and updating the predictive models. Alternatively, a processing pool may be a computing subscriber service where the predictive model processing is off loaded to a remote computing cloud or computing grid.

The query can then be sent to at least one of the plurality of expert knowledge sources 306 when the probability that a search query is related to an expert knowledge engine exceeds a relevancy threshold. A query reformulation module 312 can reformulate a search query in a format usable by the expert knowledge engine before the query is processed by the expert knowledge engine.

A result prediction module 314 can be configured to perform a cost-benefit analysis on results returned by the expert knowledge source. The result prediction module can perform quantitative decision analysis using an expected value and/or an expected cost for sending the results of a search query the user for display to form a net expected value. Then the net expected value may be used to determine when to send the search query results to the user when an operating threshold is exceeded. Alternatively, the result prediction module can be used to predict a confidence probability for the results of the expert knowledge engine and to display expert search results to a user that exceed the confidence probability.

The operating threshold may be adjusted based on an operating threshold modifier that can represent factors for increasing or reducing the operating threshold. For example the operating threshold may change based on a modifier for the topic. In addition, the modifier can take into consideration available bandwidth, costs, query budgets, or other resources, etc. For example, if a budget for an expert knowledge source is known and this budget is low (e.g., low for the month), then the modifier can lower the operating threshold so as to send more queries through even if they will likely not be successful in a pay per query situation. Alternatively, bandwidth limiting issues may be experienced (e.g., only n queries can be sent in per time to the expert service) and the operating threshold can be moved up or down using the operating threshold modifier depending on how many queries are being received so as to increase the search query flow to a maximum tolerated flow, etc.

A display module 320 can display the expert search results to the user. The display module may display the expert search results together with expert search results and the expert search results may be highlighted or displayed in a defined area of an application output window or web browser.

The result prediction model may also send the confidence probability back to the predictive model module and case library as feedback The user feedback can be used to modify the probabilities related to whether similar search queries may be sent to the same expert knowledge engine.

Figure 4:
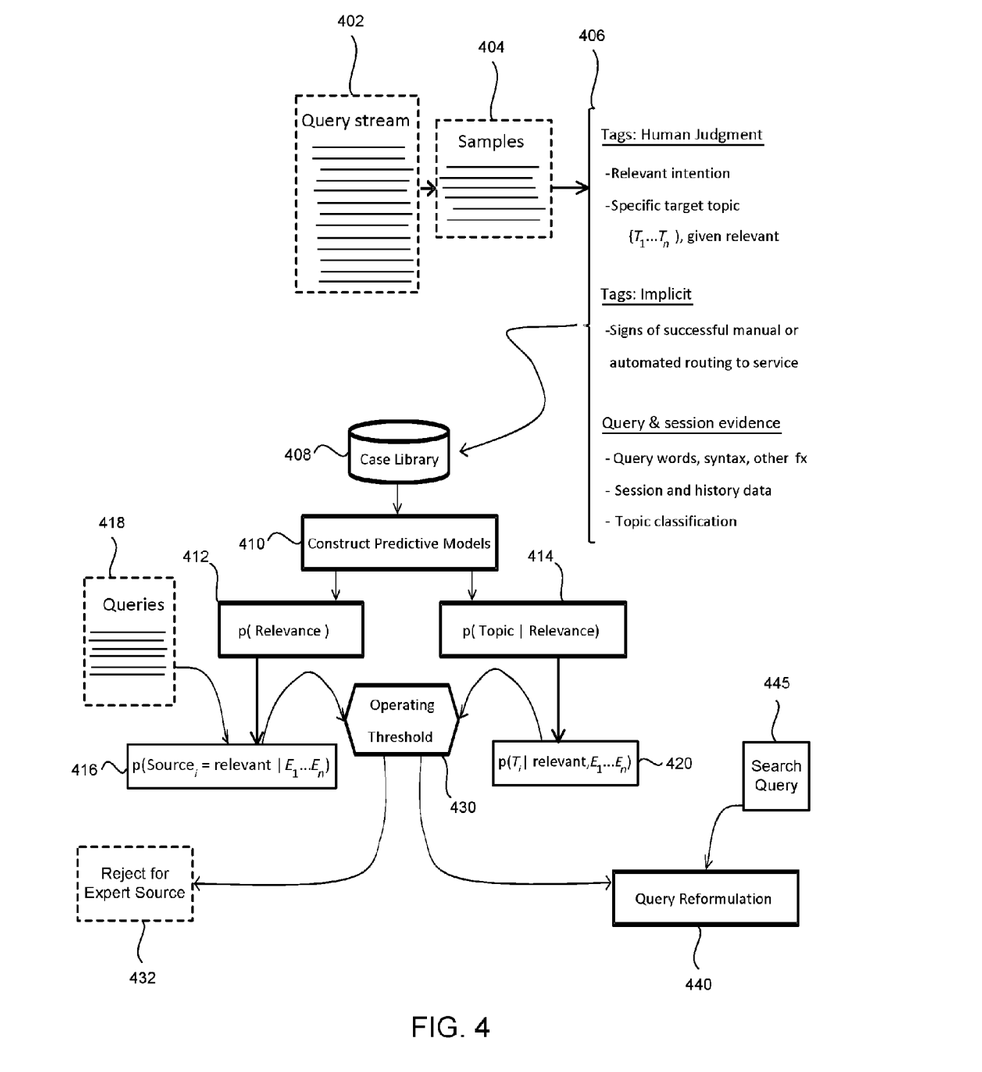
FIG. 4 is a block diagram illustrating a first part of an embodiment of a system for integrating an expert knowledge engine into a search service.

FIG. 4 illustrates a more detailed embodiment of a system for integrating expert knowledge sources into a search service. A search engine interface can receive a search query stream 402 that includes search terms from a user. The search engine interface can be a graphical user interface that is viewable by a user through a web browser, an applet in a web browser, or an application on an operating system. The search query stream can be sampled 404 so that selected search queries and/or search terms can have at least one tag applied that may define an expert subject, topical category or other related tagging for the search query. These tags 406 can be applied as human crafted tags where a human expert or human judge can ascertain the relevant intention of the user submitting the search based on the search terms submitted. In other words, a relevant expert subject can be selected by the human expert reading the words for the search terms. Specific expert topics under an expert subject heading may be identified and applied as tags for relevant search queries and/or search terms. The tagging discussed can enable a predictive model or interpretive model to learn via human judgments where a case library is tagged as to whether a query is "likely relevant" or "unlikely to be relevant" with reference to the expert knowledge source.

Implicit tags 406 may also be identified and applied to search queries and/or search terms. Manual or automated routing of the search queries to an expert search engine may generate implicit tags. In other words, learning can take place via automatically tagging search terms by watching user behavior when the search is submitted or user behavior in response to search results (e.g., clicking through on results so as to construct and to build better classifiers over time). An example of an implicit tag may be where a user interface is presented to a user with a list of various expert knowledge sources or expert topics, and the user can select a specific expert subject, topic, or expert knowledge engine that the user desires to search. Thus, an implicit tag can be generated from the user's input. An implicit tag may also be generated based on a web site, an internet address, or topical web page where a search query originated. For example, a search may come from a financial website and the implicit tag may be a finance tag. Tags may also come from evidence provided by the search query or search session. The implicit tags may also be created by the use of query terms, query syntax, or other related query effects. Further, implicit tags can be generated by history data or session data that has accumulated for a user.

A case library 408 can store a library of tags, tagged search queries, query terms, and information related to the search terms. The tagged data from the case library can be used to construct a predictive module which can generate an expected value for sending a search query to an expert search source or a probability that a search query is relevant to an expert knowledge engine. The case library can be a relational database, object oriented database or another type of database that can store the query terms, query phrases, and assigned tags.

A predictive model module 410 can construct predictive models for the given case libraries and expert knowledge sources. The predictive model module can perform quantitative decision analysis using an expected value and/or an expected cost for sending a search query to the expert knowledge engine to form a net expected value. Then the net expected value may be used to determine when to send the search query to the expert knowledge source. For example, net expected value may exceed the operating threshold in order to trigger sending the search query to the expert knowledge source or expert knowledge engine. The cost-benefit analysis can be used to weigh the cost and likely benefit of sending a search query to an expert knowledge source, considering the costs of routing a search query and the potential benefits of the informational value that may exit the pipeline.

The expected value for sending a search query to the expert knowledge source can be determined by predicting how related the search query terms are to the topic of the expert search engine. Other ways that expected value may be measured can include measuring the number of search results selected by users from the expert knowledge source for similar queries or analyzing responses to a user survey about how relevant the search results are to a search query. The expert knowledge engine may provide scores on the reliability or goodness for handling a query based a pre-query to the expert search source using the search terms. Such a reliability or goodness score can be used as an input to predictive models about the relevance of queries for the expert service or of the expected goodness for certain query terms. A human expert may also provide some expected value data on whether an expert search engine is providing valuable results for certain search terms or queries.

The expected cost for sending a search query to the expert knowledge engine can be determined by the costs of routing a search query to the expert knowledge engine. For example, the expected cost may be based on fees charged by expert knowledge source, computational overhead for the expert knowledge source, computational cost of re-writing search queries, or the budgeted number of queries provided per time period.

For example, if the computational and/or network transfer cost is low or zero than most or all queries can be routed to an expert knowledge engine and then the answers can be examined when the answers are returned. When the expected costs rise, then fewer queries may be sent to the expert knowledge source or engine. Quantitative decision analysis can be performed that considers the expected value of sending a search query to the expert knowledge source, given a learned expected value, and one or more of the costs including: fees per query, overall networking costs, server bandwidth allowances, and/or notions of a query budget that are linked to the expert knowledge source. Thus, routing may be done based on net expected value or a quantitative combination of the expected value and/or expected cost.

In another configuration, the predictive model module can determine a probability 412 that a query search or search terms are related to the expert knowledge engine using the predictive model constructed from the case library of data. Beyond the use of probabilistic models that predict the relevance of the expert source for handling queries using the queries themselves or features extracted from the queries and the larger searching and browsing sessions, more probabilistic models can also be separately be trained to predict the relevance of queries to one or more specific topics handled by the expert source. An ontology of topics and subtopics can be created that represents a breakdown of the expertise of the expert source into different areas and the probabilistic models can be constructed and trained to predict that a query is relevant to each topic 414 representing a type of competency of the expert knowledge engine.

The probability that the search query is related to a specific expert knowledge engine source can also be revised 416 based on any additional evidence $E_n$, or factors known about the search query 418 or related search queries. Additional evidence may be based upon the original query, the updated query terms, the subject being searched, the difference in the number of query terms in a rewritten query as compared to the original query, and other evidence. Multiple aspects of a user's session or multiple sessions can be considered along with the current query. A similar process can be applied to the probability that a topic is relevant to a search query 420 where additional outside evidence $E_n$, or factors can be taken into account.

In one embodiment, once relevance is established to the subject matter of the expert knowledge engine, then the search query can be analyzed to determine whether the search query is relevant to a topic in the expert knowledge engine. When the search query has been determined to be relevant to the expert knowledge engine and/or topics in the expert knowledge engine, then the search query can be submitted to the expert knowledge engine and/or the topical search portion of the expert knowledge engine.

In an example of the predictive model module, a correlated feature set of important search terms, search phrases, or search queries can be built using the case library or case database. A separate correlated feature set can be correlated to each expert knowledge database or an integrated correlated feature set may be used for many expert knowledge databases. The correlated feature set can be built by selecting terms from the case library that have a probability of being related to the specific expert knowledge database. For example, a feature set can be selected using a feature ranking algorithm where features or search terms that reach a certain score for important metrics are included. Alternatively, subset selection can intelligently search the entire subset for a desired subset. The correlated feature set can also be selected by a human but this can be time consuming.

A selected feature set for search query and the expert knowledge database can be encoded as a vector of binary features representing the binary existence of specific query search terms that may trigger the use of the expert knowledge database. Additionally, the feature set of query search terms that may be related to an expert knowledge database can be represented using other useful machine storage representations such as relational databases, object oriented databases, multi-dimensional vectors, or other storage representations.

A selection of search queries can be obtained from the search query stream. The selection of sampled search queries can be performed by selecting a defined sample of search queries from at least one database storing search queries (e.g. with a sample size that is statistically relevant for the search terms being studied). In one example, the data may be obtained from the databases of search queries from one or more search engines.

A model can be created to help predict the expert knowledge engine to which a search query is likely to be related based on the correlated feature set. The model used to predict whether an expert knowledge database may be selected can be a statistical model configured to be trained using a multivariate statistical correlation model. Some examples of a multivariate statistical model that can be used include: logistic regression, Naïve Bayes Classifier, Principal Component Analysis, Decision Trees, Bayesian networks, Nearest Neighbor methods, or any other suitable multivariate statistical analysis model which enables the study of the probable linkage between a search query and an expert knowledge engine. The model used to predict whether a search query is relevant to an expert knowledge engine can also use causal reasoning that is applied to the search terms in order to make statistical links between search terms.

A probability that a given search query is related to an expert knowledge engine can then be predicted using the defined effect by the model and a specified predictor by applying statistical analysis to the search query using the predictive model built from the case library. This means the specified predictor can provide a probability that the search query terms are related to a certain expert knowledge engine. As a result, the defined effect for the search query being tested can be estimated based on the statistical model, computed probability, correlated features from the database, and desired results for the model. An analytics module can create a model to predict a probability that a search query is related to an expert knowledge engine based on a correlated feature set. The model can be also configured by users to build predictive models to target a feature or feature set.

The case library can also be configured to obtain a selection of existing search queries for correlating to expert knowledge sources. These search queries may be selected randomly in order to generate a broad randomized sampling of search queries over many types of expert topics, or search queries can be sampled for one specific expert topic to form the relationship probability.

In FIG. 4, when the probability that a search query is related to a selected expert knowledge engine exceeds an operating threshold 430, then the search query can be sent to the expert knowledge engine. Otherwise, the search query may be rejected for the expert source 432.

Before the search query is processed by the expert knowledge engine, the query may have query reformulation 440 applied to the search query 445. The search query may be reformulated or revised into a format usable by the expert knowledge engine.

The expert knowledge engine may reformulate the query into defined protocol formats such as SQL query language, normalized forms, mathematical forms or other syntactic or semantic forms used by the expert knowledge sources. The query reformulation module can reformulate a query based on expert rules for a relevant expert knowledge engine and topic. The query reformulation module can also use an expert engine to learn to re-write queries for specific topics in the expert knowledge engine. A query can also be reformulated so that a separate query re-write can be created for one or more of a plurality of topics in the expert knowledge engine.

One approach to constructing answers relies on procedures for converting questions into sets of words that may appear in the source data set. A variety of query-rewriting procedures may be applied to convert questions into sets of queries posed to search engines, and techniques may be employed to convert one or more query results into an answer.

An example of query reformulation changes each user question into likely substrings of declarative answers to the question. For a question, several rewrites may be generated using rewrite heuristics. The rewrites can vary from specific string matching to a simple "ANDing" of all the query words. As an example, for the query "Who killed Abraham Lincoln?" the following rewrites can be provided: <LEFT>"killed Abraham Lincoln"; "Abraham Lincoln was killed by"<RIGHT>; and killed AND Abraham AND Lincoln. <LEFT> and <RIGHT> refer to the likely placement of candidate answers. The <LEFT> and <RIGHT> operators represent searching wildcards. The first two rewrites are structured so that a text on the internet or web can match an exact phrase, such as "killed Abraham Lincoln." The last example rewrite can be referred to as a conjunctional back-off strategy, as the last example simply "ANDs" together all the query words, leading to less specific queries. The rewrite strings can be formulated as search engine queries and sent to a search engine from which page summaries are collected. Then an expert knowledge engine can be used as the provider of results to the second stage of analysis. Heuristic scores can be assigned to results of different kinds of rewrites. The system can assign higher weights to the results of more precise rewrites than is assigned to the more general, conjunctional back-off rewrite.

In order to limit the number of queries issued by the query reformulation module, expert-derived heuristic functions or Bayesian models can be used that may generate probabilities of success for various rewrites. Thus, a ranking of individual query rewrites can be provided and only a pre-defined number of the highest ranked query reformulations can be used. For example, the top five to ten ranked query reformulations may be picked. Scoring query rewrites can help avoid the nonsensical or redundant queries that can be created through query reformulation. In the case of Bayesian learning procedures, models can be generated from a set of training cases that can be used to infer the probabilistic lift in accuracy that queries of different types may confer. Such models may provide a normalized metric for ordering sets of queries by their value.

Certain factors may be considered when establishing a query quality gradient or query valuation system. For example, the queries can be separated into two categories: (1) queries that involve ANDing of individual words and occasionally short phrases (e.g., population AND "of Japan"), and (2) queries that contain a single phrase (e.g., "the population of Japan is"). The former can be referred to as conjunctional rewrites, and the latter can be referred to as phrasal rewrites.

These two sets of queries have several distinct features. For both types of rewrites, the number of distinct words and the number and percentage of stop words present in the queries can be observed. For building predictive models of the goodness of phrasal rewrites, a statistical natural language parser for English text can be used. The syntactic parser may construct multiple parse trees, capturing multiple hypotheses for an input string, based on a consideration of the likely different parts of speech that words in a phrase can have. After producing all hypotheses, the parser may employ a language model to rank the likely syntactic hypothesis, computing probabilities of each parse tree as the product of the probability of all of the nodes in the tree. The application of NLP parsing to each query rewrite does not put a significant computational burden on hosting query clients because rewrites are parsed on an order of milliseconds. Features output by the parser can be used for valuing query rewrites. The features used for rewrite valuation can include the number of primary and secondary parses and the likelihood assigned to the maximum probability parse tree. Such features can be a measure of the grammatical "goodness" of a query rewrite.

To construct predictive models for inferring the best ordering of queries, statistical modeling, such as logistic regression, Support Vector Machines (SVMs), or Bayesian structure learning may be used. The latter method generates Bayesian networks, which capture and represent dependencies among variables and main influences on a target variable of interest. Given a dataset, Bayesian-network learning methods can perform a heuristic search over a space of dependency models and can employ a Bayesian model score to identify models with the greatest ability to explain the data. At run time, these models can be used to analyze evidence and output probability distributions over variables of interest that have not yet been observed or that cannot be observed directly.

In a learned predictive model for conjunctional rewrites, capturing the probability that the answer may be correct can be influenced directly by the number of capital words, the longest phrase, the number of stop words, the longest word, and the percentage of stop words in the query rewrite. Other observable factors influence the probability that answers will be correct via dependencies with these variables. Predictive models can provide inferences about the probabilities that specific single rewrites will lead to a correct answer to a question. Given a set of query rewrites, the inferred probabilities that individual queries will achieve a correct answer as a query-quality score can be used for ordering the list of rewrites in a subsequent analysis. The ordering provides a decision mechanism for a cost-benefit analysis of the ideal number of queries to issue to an expert knowledge engine. Although probabilistic methods are used, the ordering can be considered a heuristic approximation in a system that uses ensembles of queries.

Figure 5:
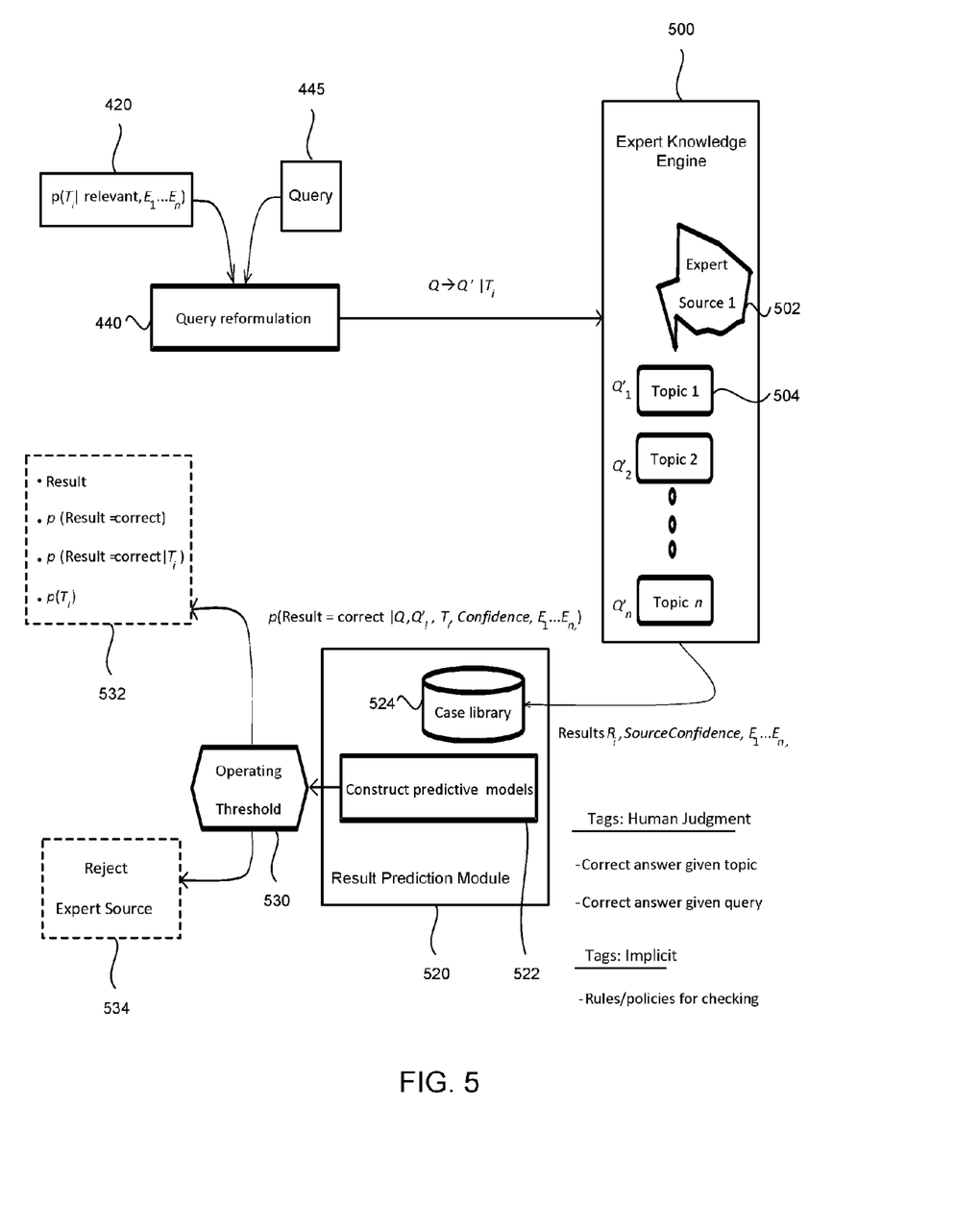
FIG. 5 is a block diagram illustrating a second part of an embodiment of a system for integrating an expert knowledge engine into a search service, as related to FIG. 4.

FIG. 5 illustrates a second part of the system and/or process described in FIG. 4. FIG. 5 includes an expert knowledge engine 500 to enable retrieval of expert data from an expert source. The expert knowledge engine can receive the reformulated search query described in FIG. 4, and the search query can either be fulfilled by expert subject 502 or expert topic 504.

A result prediction module 520 can be configured to perform a cost-benefit analysis, as information is available, on the search results returned by the expert knowledge source. The result prediction module can perform quantitative decision analysis using an expected value and/or an expected cost to form a net expected value regarding sending the results of a search query to the user for display. Then the net expected value may be used to determine when to send the search query results to the user. For example, a numeric gauge of the net expected value can be compared to an operating threshold to determine whether to send the search results to an end user. The cost-benefit analysis can be used to weigh the expected cost and expected benefit of sending the search results from an expert knowledge source to the user. An analysis may consider the costs of routing the search results, displaying the search results, and the potential value of the search results from the pipeline to the user.

In another configuration, the result prediction module can be configured to predict a confidence probability for the results of the expert knowledge engine. The confidence probability may be determined by checking certain factors such as the original query, the updated query terms, and the topic being searched as compared to the results. A probability threshold (or operating threshold) for the output cost-benefit analysis can be computed by doing a cost-benefit analysis. In addition, a probability threshold can be also set by hand heuristically.

Other evidence $E_n$ may also affect the confidence probability determination such as: whether a query timed out, an internal confidence returned from the expert knowledge engine, and other evidence factors. For example, an expert knowledge engine may know when no specific result has been found and that can be reported back. Another example is where text may be received as an answer when a numerical value was expected for a computation, and then this incorrect output format may be evidence that the probability of the search success is lower. The search results may also be mingled with other more general search results. For instance, one or two of the most specific general search results can be displayed followed by the expert search results, which may then be followed by general image or video search results.

In one example, models for predicting the success of queries can be built 522 using a case library. Bayesian networks can be created from a training set consisting of cases of single queries and answers labeled by their correctness. The training cases can be trained by running queries against the expert knowledge engine. For each query, the rewrites generated can be collected. The cases can be created by examining features of conjunctional and phrasal query rewrites provided by the system, and noting the success of the system in answering the questions with single queries. The accuracy of the models can be tested on a new set of known queries applied against the expert knowledge engine. Then the model can be used to verify the correctness of unknown queries.

When the confidence probability for the results exceed a certain confidence probability threshold 530 as predicted by the probability result prediction module, then the expert search results may be displayed to the user 532. Alternatively, if the confidence probability for the search results is below the confidence probability threshold then the search results may be rejected 534 and may not be displayed to the user. The expert search results can be displayed as independent results or the expert search results can be displayed in an expert search area along with general search results. For example, a web page or application that is displaying the search results may provide a search result box, a highlighted search area, or comparison of the expert search results with general search results.

In some situations, the expert knowledge source can provide scores on the reliability or goodness of answers for the search queries from the expert knowledge engine's service. The internal evaluation of the goodness and value of the answers provided can also be used for deciding whether to display the search results to a user.

The actions of a user in response to the displayed result can be used to further improve the accuracy of a selection of the expert knowledge engine. If the user selects the top search result from the displayed search result, then the system can infer that a successful search result was found. The associated tags and terms in the case library database can be modified accordingly. On the other hand, when the user does not select any of the search results but submits another similar search query to the search interface during the same search session, then the system can infer that no relevant search results were found and the tags and terms in the case database can be adjusted for the expert knowledge sources selected. As described with learning whether a search query is relevant to an expert knowledge source, learning via human judgments can also take place for the output search results. In the case of the search query output, human input can help determine whether the output or search result provided by expert knowledge source is relevant to the search query. A human judge can tag a case library of search query terms with "likely relevant" or "unlikely to be relevant" that represent whether the query output was relevant to the original query. As mentioned above, such tags can also be learned automatically by watching user behavior, (e.g., clicking through on results so as to construct and to build better classifiers over time).

Further, the predictive models or rules can be based on automated learning and human tagging by considering when queries are relevant or not irrelevant for one or more topics in an ontology of topics that are known to be handled by an expert source. The tags can be used as an intermediary means for assessing relevance of different aspects of the expert source, where predictive models can be made on a topic by topic basis.

Figure 6:
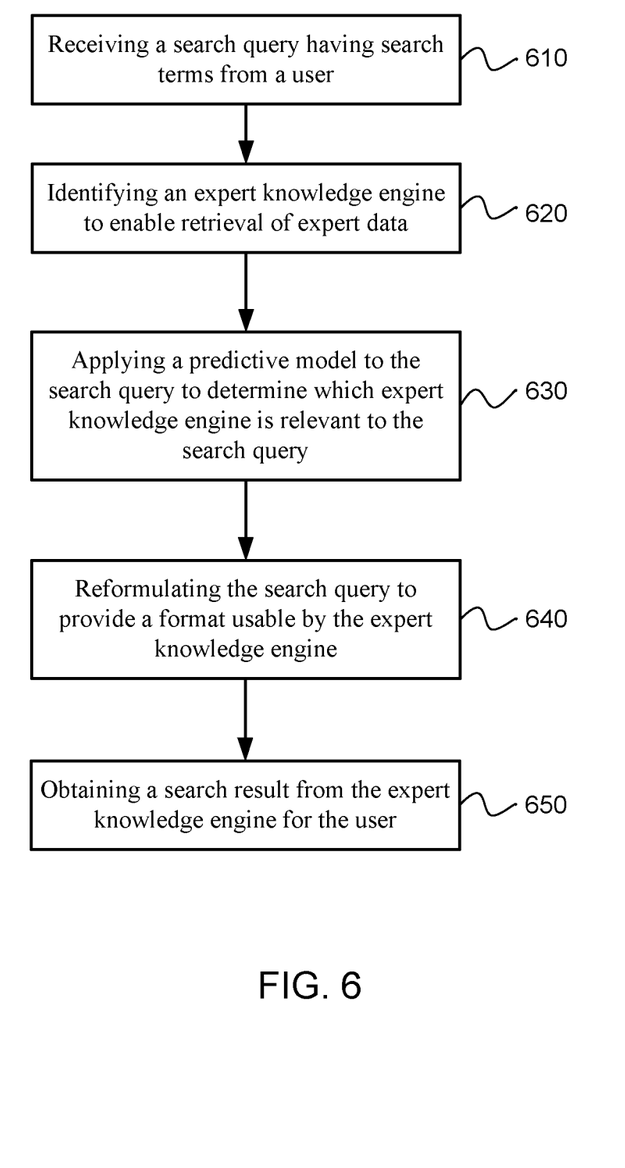
FIG. 6 is a flow chart illustrating a method of integrating expert knowledge sources into more general search services.

FIG. 6 illustrates a method for integrating expert knowledge sources into general search services. The method includes the operation of receiving a search query having search terms from a user, as in block 610. An expert knowledge engine can be identified to enable retrieval of expert data for the search query, as in block 620. This expert knowledge engine may initially be just a candidate for submission of the search query.

A predictive model constructed from a case library of queries and associated tags can be applied to the search query to determine which expert knowledge engine is relevant to the search query, as in block 630. This determination can be made based on a probability generated using statistical models regarding whether the search query is related to the expert knowledge engine. When the relevance probability exceeds a defined value then the search query can be sent to the expert knowledge engine.

The search query can be reformulated to provide a format usable by the expert knowledge engine, as in block 640. Such reformulations may include converting the search query into an equation, an expert rule, a foreign language, or source code for an expert search engine. The term "usable" as discussed here can mean reformatting of a user's search query to a form a query that can be parsed by the expert engine in a way that preserves the original intent of the user. For example, an expert knowledge source (e.g. Wolfram Alpha) may need to be guided on how to interpret a query. A user may type in the query "William gates" with the intent of getting information about William (Bill) Gates, III, a founder of Microsoft Corporation. If the terms "William gates" are sent verbatim to the expert knowledge source, the expert knowledge source may interpret the query as the user's request to compare the two last names William and gates. In contrast, the query reformulation process of the present technology may convert the query to either "bill gates" or "William gates III" for the expert search system to interpret the terms properly.

In another example, the terms "Georgia Russia" may be submitted by a user to an expert knowledge source. This query might be interpreted by the expert knowledge source as asking how far (in distance) Georgia (the U.S. state) is from Russia, when the actual intent of the query is more likely to find out about the Georgia republic that used to be part of USSR. The query rewrite system can reformulate this query to include the revised term "country: Georgia" to force the expert system to interpret the query correctly.

A search result can then be obtained from the expert knowledge engine for the user, as in block 650. The search results can be displayed to an end user via a user interface in a web browser or a searching software application with a user interface.

In one example configuration, a search result of the reformulated search query can be analyzed or tested to determine a confidence probability. If the confidence probably exceeds a pre-defined operating threshold, then the results can be displayed to the user. The expert search results may be displayed in an expert search area along with general search results.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

Furthermore, the described features, structures, or characteristics may be combined in any suitable manner in one or more embodiments. In the preceding description, numerous specific details were provided, such as examples of various configurations to provide a thorough understanding of embodiments of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

The invention claimed is:

1. A computer-implemented process for integrating a specialized knowledge source into a general search service, comprising using a computer to perform process actions for:
   using a search engine interface to receive a search query having search terms from a user;
   providing multiple expert knowledge engines each configured to enable retrieval of expert search results;
   using a predictive model module configured to generate a predictive model that provides a measure of a likelihood that one or more of the expert knowledge engines will provide valuable information for the search query and selecting one or more of the expert knowledge engines having highest probabilistic likelihoods of providing valuable information in response to the search query;
   using a query reformulation module to automatically reformulate the search query into multiple reformulated queries having increased probabilities of being effectively used by the selected expert knowledge engines to return relevant search results, determining a probabilistic ranking for each reformulated query, and providing one or more of the highest ranked queries for use by one or more of the selected expert knowledge engine to retrieve expert search results; and
   using a display module configured to display the retrieved expert search results to the user.

2. The computer-implemented process as in claim 1, further comprising using a result prediction module configured to predict a confidence probability for the expert search results of the selected expert knowledge engines.

3. The computer-implemented process as in claim 2, wherein the expert search results are displayed to the user when the result prediction module predicts that the search results have a confidence probability that exceeds an operating threshold.

4. The computer-implemented process as in claim 1, wherein the predictive model module is configured to perform quantitative decision analysis using an expected value and an expected cost for sending a search query to the expert knowledge engines to form a net expected value, wherein the net expected value is used to determine whether to send the search query to one or more of the expert knowledge engines.

5. The computer-implemented process as in claim 1, wherein the display module displays the expert search results in an expert search area along with general search results.

6. The computer-implemented process as in claim 1, wherein each of the expert knowledge engines include expert information about a plurality of topics and further comprises a topic relevance module configured to predict a relevance of a topic in the expert knowledge engine once the search query has been determined to be relevant to the expert knowledge engine.

7. A computer-implemented process as in claim 1, further comprising a case library that includes search queries and query features that are tagged by success or failure of the expert knowledge engines to provide a valuable response, and wherein the case library is used to construct a predictive model to determine a probability that the search query is relevant to one or more of the expert knowledge engines.

8. A computer-implemented process as in claim 1, wherein the query reformulation module reformulates the search query based on expert rules for the expert knowledge engines and topics.

9. A computer-implemented process as in claim 1, wherein the query reformulation module reformulates the search query so that a separate query re-write is created for each of a plurality of topics in one or more of the expert knowledge engines.

10. The computer-implemented process as in claim 1, wherein the predictive model module is configured to determine a probability that the search terms are related to one or more of the expert knowledge engines and to send the search query to one or more selected expert knowledge engines when the probability exceeds an operating threshold.

11. The computer-implemented process as in claim 10, wherein the operating threshold will vary based on operating threshold modifiers.

12. A computer-readable medium having computer executable instructions stored therein for integrating expert knowledge sources into general search services, said instructions causing a computing device to execute a method comprising:
receiving a search query having search terms from a user;
providing a plurality of expert knowledge engines configured to enable retrieval of expert data;
applying a predictive model to evaluate each of the expert knowledge engines in combination with the search query to select a single one of the expert knowledge engines having a highest probabilistic relevance to the search query;
using one or more probabilistic models for automatically reformulating the search query to provide one or more reformulated queries each having higher probabilities of returning a correct search result from the selected expert knowledge engine than the original search query; and
obtaining one or more expert search results from the selected expert knowledge engine for one or more of the reformulated search queries.

13. A method as in claim 12, further comprising:
testing the expert search result of the reformulated search query to determine a confidence probability; and
displaying the expert search result to the user based on the confidence probability exceeding a operating threshold.

14. The method as in claim 12, further comprising displaying the expert search results in an expert search area along with general search results.

15. The method as in claim 12, further comprising using a user action in response to the expert search result to further improve the accuracy of a selection of the expert knowledge engine for the search query.

16. The method as in claim 12, further comprising predicting a relevance of a topic in the expert knowledge engine once the search query has been determined to be relevant to a subject of the expert knowledge engine.

17. A computer-implemented process for integrating expert knowledge sources into a search service, comprising using a computer to perform process actions for:
using a search engine interface to receive a search query having search terms from a user;
providing multiple expert knowledge engines configured to enable retrieval of expert search results;
providing a case library having tagged search cases related to the search terms;
using a predictive model module configured to determine a probability that the search terms are related to one or more of the expert knowledge engines and to select each expert knowledge engine having a probability that exceeds an operating threshold;
for each selected expert knowledge engine, using a query reformulation module to separately reformulate the search query to provide one or more reformulated queries each having higher probabilities of returning a correct search result from the corresponding expert knowledge engine than the original search query;
obtaining one or more expert search results from each selected expert knowledge engine for one or more of the corresponding reformulated search queries; and
using a display module configured to display the obtained expert search results to the user.

18. The computer-implemented process as in claim 17, further comprising using a topic relevance module configured to predict a relevance of a topic in the expert knowledge engine once the search query has been determined to be relevant to a subject of the expert knowledge engine.

19. A computer-implemented process as in claim 17, wherein the predictive model module is constructed using the case library of tagged data and the predictive model is used to determine a probability that a search query is relevant to an expert knowledge engine.

20. A computer-implemented process as in claim 17, wherein the query reformulation module reformulates a query based on expert rules for the expert knowledge engine or topics.

* * * * *